(12) United States Patent
Kowal et al.

(10) Patent No.: US 7,058,521 B2
(45) Date of Patent: Jun. 6, 2006

(54) LOW POWER ULTRASONIC FLOW METER

(75) Inventors: Anthony J. Kowal, Berlin, MA (US);
Benjamin Edward McDonald, Ashland, MA (US); Xue-Song Scott Li, Lexington, MA (US)

(73) Assignee: Panametrics, Inc., Waltham, MA (US)

( * ) Notice: Subject to any disclaimer, the term of this patent is extended or adjusted under 35 U.S.C. 154(b) by 119 days.

(21) Appl. No.: 10/810,882

(22) Filed: Mar. 26, 2004

(65) Prior Publication Data
US 2005/0235758 A1 Oct. 27, 2005

(51) Int. Cl.
*G01F 1/00* (2006.01)
*G01F 7/00* (2006.01)

(52) U.S. Cl. ........................................ 702/45

(58) Field of Classification Search ............... 702/48, 702/45
See application file for complete search history.

(56) References Cited

U.S. PATENT DOCUMENTS

| 4,787,252 | A | 11/1988 | Jacobson et al. | |
| 6,388,431 | B1 | 5/2002 | Kramer et al. | |
| 6,626,049 | B1 | 9/2003 | Ao | |
| 6,928,369 | B1* | 8/2005 | Kishimoto et al. | 702/45 |
| 2003/0139146 | A1* | 7/2003 | Mercier | 455/73 |
| 2005/0137812 | A1* | 6/2005 | Schaffer et al. | 702/60 |

FOREIGN PATENT DOCUMENTS

| JP | 2004-093371 | 3/2004 |
| WO | WO 00/70313 | 11/2000 |

* cited by examiner

*Primary Examiner*—John Barlow
*Assistant Examiner*—Demetrius Pretlow
(74) *Attorney, Agent, or Firm*—Iandiorio & Teska (57) ABSTRACT

A flow meter is powered by a loop power supply which supplies a supply voltage. A load is powered by a load voltage and includes at least a processor for calculating a flow rate, an ultrasonic transducer power circuit, and an ultrasonic transducer receiving circuit. A power regulating circuit is disposed between the loop power supply and the load and includes a power converter responsive to the supply voltage to vary the load voltage in response to a control signal, a safe storage device between the converter and the load for storing power and for delivering power when required by the load, and a control subsystem for providing the control signal to the converter based on the setting of the loop power supply by the load. A power management detects the load voltage and to reduces the power consumption of the load at one or more predetermined set points.

75 Claims, 5 Drawing Sheets

LOW POWER ULTRASONIC FLOW METER

FIELD OF THE INVENTION

This invention relates generally to an ultrasonic flow meter and in particular to an intrinsically safe, low power ultrasonic flow meter.

BACKGROUND OF THE INVENTION

Ultrasonic flow meter systems are used for measuring the rate of fluid (e.g., gas or liquid) flow within a conduit such as a pipe. In one particular system, two transducers are disposed on the exterior of the conduit at an oblique angle to each other. One transducer is the upstream transducer and the other is the downstream transducer. The rate of fluid flow through the conduit is determined by first transmitting a pulse from the upstream transducer to the downstream transducer. Next, the downstream transducer transmits a pulse to the upstream transducer. The transit time of the pulse transmitted from the upstream transducer to the downstream transducer is less than the transit time of the pulse transmitted in the reverse direction and the fluid flow rate can be determined (calculated) based on the difference in the transit time of the two pulses. Those skilled in the art know that the transducers can be clamped on the exterior of the conduit or can be inserted through the wall of the conduit (e.g., "wetted transducers").

A typical flow meter system includes the transducers and an electronic controller powered by a standard power supply. The controller controls the transducers and responds to the signals output by the transducers to calculate the flow rate. In some installations, for example when hazardous explosive gasses are present, the controller must be placed within an explosion proof enclosure. The power supply connections require cable conduits or other special handling typically required for wiring to an explosion proof enclosure. Presently available ultrasonic flow meters cannot be installed in their entirety, including the transducers and all of the flow meter electronics, in a hazardous area because they do not meet the specific requirements of hazardous areas as, for example, specified in EN50020 or Approval Standard Class Number 3610.

There are also uses for ultrasonic flow meters where a traditional power supply is not available. Presently designed flow meter controllers consume high power levels and presently available ultrasonic flow meter systems cannot generally be powered by alternative energy sources such as battery or solar power type supplies for an extended period of time.

DESCRIPTION OF THE INVENTION

The flow meter of the subject invention operates on low power and is intrinsically safe so that it can be used in hazardous areas without the need for an explosion proof enclosure around the controller. Moreover, batteries or solar cells can be used to power the controller when traditional power sources are not available. By implementing a flow meter powered by a 4 to 20 milliamp current loop power supply regulated by a unique circuit, by including a unique power management subsystem, and by using highly efficient transducers, the flow meter of the subject invention can be used in hazardous areas without the need for an explosion proof enclosure around the controller and/or the flow meter can be used in scenarios where a traditional power supply is not available because the flow meter can be powered by batteries, solar power, or other types of low power supplies.

This invention features a flow meter comprising a loop power supply for supplying a supply voltage and a load powered by a load voltage and including at least a processor for calculating a flow rate, an ultrasonic transducer power circuit, and an ultrasonic transducer receiving circuit. A power regulating circuit is disposed between the loop power supply and the load. The preferred power regulating circuit includes a power converter responsive to the supply voltage to vary the load voltage in response to a control signal, a safe storage device between the converter and the load for storing power when not needed by the load and for delivering power to the load when required by the load, and a control subsystem for providing the control signal to the converter based on the setting of the loop power supply by the load. Also included may be a power management subsystem configured to detect the load voltage and to reduce the load power consumption at at least one predetermined set point.

Typically, the loop power supply is a 4–20 mA loop power supply, the power converter is a switching power converter, and the safe storage device is a capacitor with a value of less than 100 µF.

The control subsystem may include a control amplifier with one input connected to the loop power supply and another input connected to a reference voltage. The processor is then programmed to output the reference voltage to the control amplifier based on the flow rate. The power regulating circuit may further include a voltage clamp such as a Zener diode between the regulator and the load for limiting the load voltage.

The power management subsystem may include a high level power management section configured to measure the power draw of selected modules of the load and to implement a rules set to regulate the operation of the modules based on the power draw of each module.

The power management subsystem may further include a low level power management section with at least a first voltage detector configured to compare the load voltage with a first set point voltage and to output a first warning signal to the processor when the load voltage is less than the first set point voltage. The processor is programmed to initiate a first power reduction instruction set in response to the first warning signal to reduce the load power consumption. The low level power management section may further include a second voltage detector configured to compare the load voltage with a second set point voltage and to output a second warning signal to the processor when the load voltage is less than the second set point voltage. The processor is then programmed to initiate a second power reduction instruction set in response to the second warning signal to further reduce the load power consumption.

Transducers are typically connected to the load and may include a composite piezoelectric element. The piezoelectric element has an array of cells isolated from each other by channels filled with potting material. One or more batteries may power the loop power supply. Alternately, one or more solar cells may power the loop power supply.

A flow meter in accordance with this invention may include a loop power supply for supplying a supply voltage; a load powered by a load voltage and including at least a processor for calculating a flow rate, an ultrasonic transducer power circuit, and an ultrasonic transducer receiving circuit; a power regulating circuit between the loop power supply and the load; and a power management subsystem configured to detect the load voltage and to reduce the load power consumption at at least one predetermined set point. Preferably, the power regulating circuit includes a power converter responsive to the supply voltage to vary the load voltage in response to a control signal, a safe storage device between the converter and the load for storing power when not needed by the load and for delivering power to the load when needed by the load, and a control subsystem for providing the control signal to the converter based on the setting of the loop power supply by the load.

A flow meter in accordance with this invention may include a loop power supply for supplying a supply voltage; a load powered by a load voltage and including at least a processor for calculating a flow rate, an ultrasonic transducer power circuit, and an ultrasonic transducer receiving circuit; and a power regulating circuit between the loop power supply and the load. The power regulating circuit typically includes a power converter responsive to the supply voltage to vary the load voltage in response to a control signal, a safe storage device between the converter and the load for storing power when not needed by the load and for delivering power to the load when required by the load, and a control subsystem for providing the control signal to the converter based on the setting of the loop power supply by the load.

One method in accordance with this invention for regulating power between a loop power supply and a load powered by a load voltage includes varying the load voltage in response to a control signal, storing power when not needed for the load, delivering stored power to the load when required to power the load, adjusting the control signal based on the setting of the loop power supply, detecting the load voltage, and reducing the load power consumption at one or more predetermined set points.

The loop power supply is typically a 4–20 mA loop power supply. Adjusting the control signal typically includes comparing the loop power supply to a reference voltage. The reference voltage level is typically based on a flow rate. The method may further include clamping the load voltage at a predetermined limit.

The step of reducing the power consumption may include comparing the load voltage with a first set point voltage and outputting a first warning signal when the load voltage is less than the first set point voltage and initiating a first power reduction instruction set in response to the first warning signal to reduce the load power consumption. The step of reducing the load voltage may further include comparing the load voltage with a second set point voltage and outputting a second warning signal when the load voltage is less than the second set point voltage and initiating a second power reduction instruction set in response to the second warning signal to further reduce the load power consumption. Reducing the load power consumption may also include measuring the power draw of selected modules of the load and implementing a rules set to regulate the operation of the modules based on the power draw of each module.

BRIEF DESCRIPTION OF THE DRAWINGS

Other objects, features and advantages will occur to those skilled in the art from the following description and the accompanying drawings, in which.

DETAILED DESCRIPTION OF THE INVENTION

Aside from the examples or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
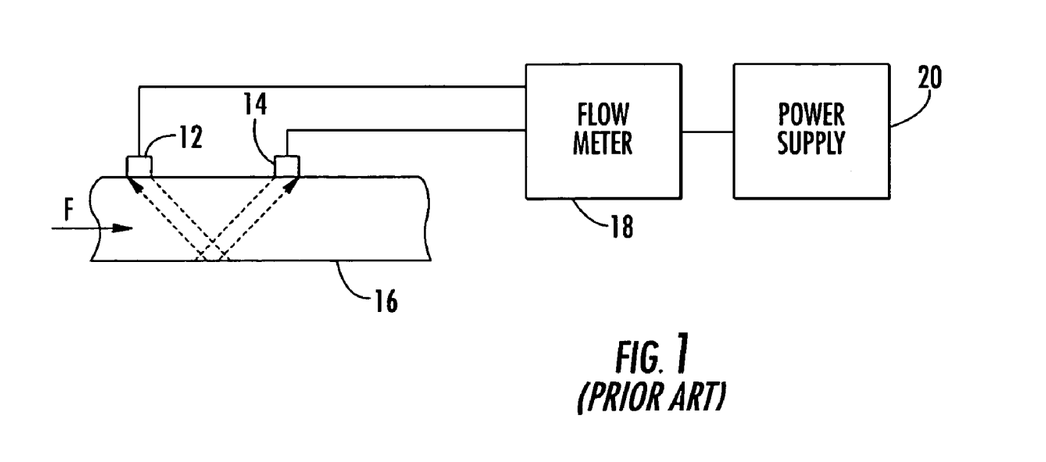
FIG. 1 is a highly schematic diagram of a typical ultrasonic flow meter system installation.

One typical prior art flow meter 10, FIG. 1 includes upstream ultrasonic transducer 12 and downstream ultrasonic transducer 14. Ultrasonic transducers 12 and 14 may be clamp on transducers, wetted transducers, may be on the same side of conduit 16, or may be on the opposite side of conduit 16. Transducer 12 sends a signal through the flow (liquid or gas) in conduit 16 to be received by transducer 14 and transducer 14 sends a signal through the flow in conduit 16 to be received by transducer 12. As explained in the Background section above, the difference in the transit time between the two signals is calculated by flow meter 18 as is the resulting flow rate of the fluid within conduit 16. As shown, flow meter 18 is powered by power supply 20.

Figure 2:
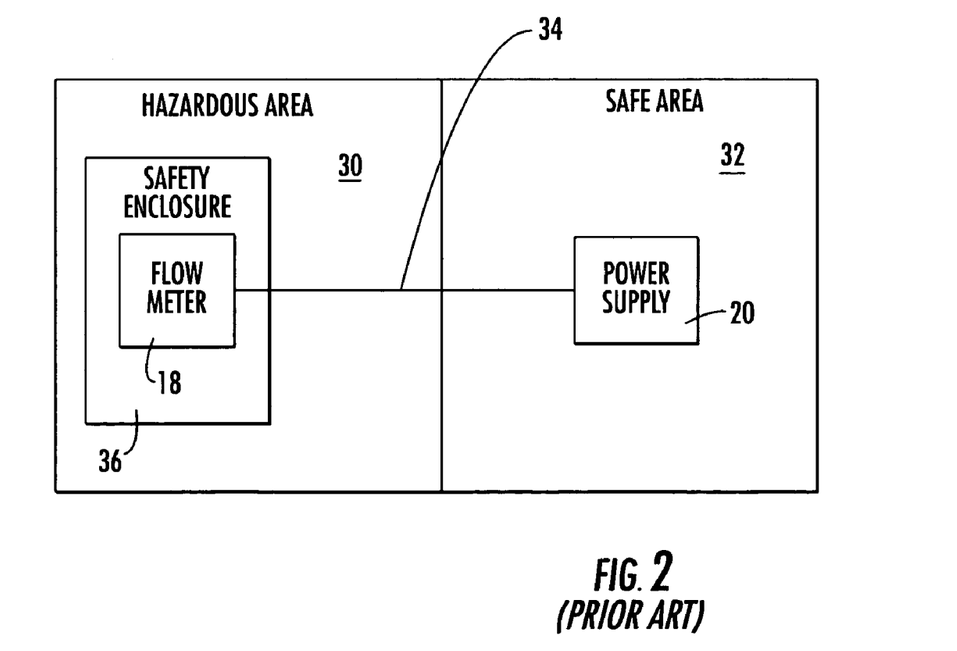
FIG. 2 is a block diagram showing a flow meter system installed in a hazardous area.

When flow meter 18 is used in hazardous area 30, FIG. 2, power supply 20 must be located in safe area 32 and connected to flow meter 18 through cable conduit 34. Furthermore, flow meter 18 must be housed in a suitable safety enclosure 36 due to the heat generated by the electronic and electrical components of flow meter 18 and the possibility of a spark igniting an explosive gas in hazardous area 30.

As explained in the Background section above, presently available ultrasonic flow meters do not meet typical hazardous area intrinsic safety specifications for electrical or electronic devices located within hazardous areas, in that the entire meter electronics may not be installed in a hazardous area unless enclosed in an explosion proof enclosure.

Figure 3:
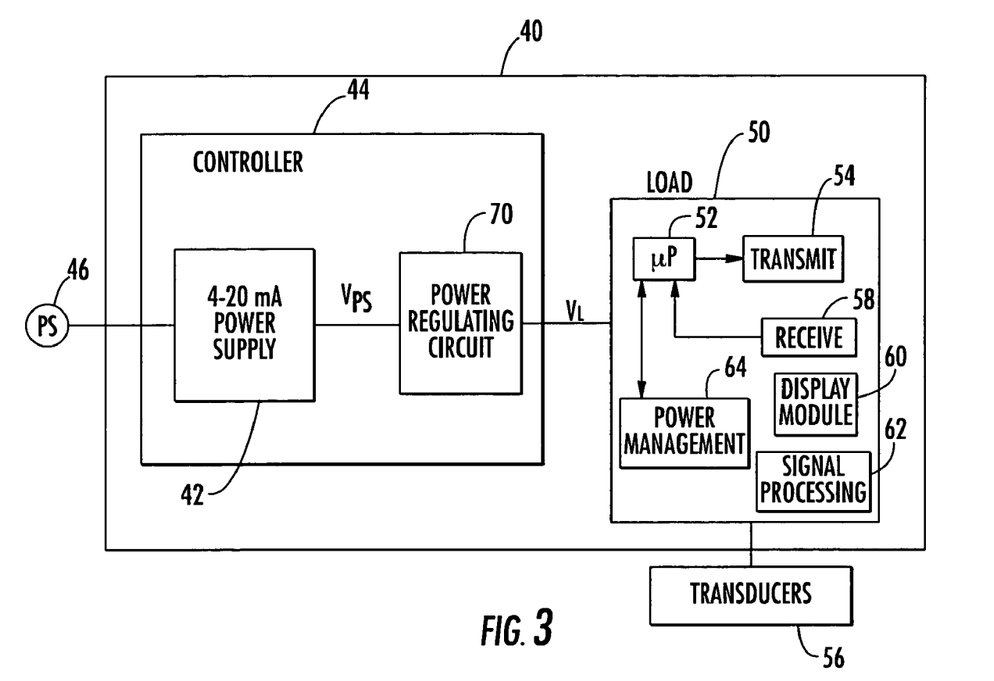
FIG. 3 is a block diagram showing the primary components associated with an example of an ultrasonic flow meter in accordance with the subject invention.

Flow meter 40, FIG. 3 in accordance with the preferred embodiment of the subject invention includes loop power supply 42 for supplying a supply voltage $V_{ps}$. Typically, loop power supply 42 is a part of controller 44 powered by power supply 46 which may be a conventional power supply but which, in accordance with the subject invention, may also be a battery or a set of batteries or a solar power (solar cell) type power supply due to the low power requirements of the flow meter of this invention. Other low power sources may also be used. In some cases, power supply 46 may directly power power regulating circuit 70, and supply 42 will not be used.

In general, due to the use of the two-wire 4–20 mA loop power supply 42, the flow meter of the subject invention draws less than 50–60 mW of power which is 20 times less than some conventional flow meters. The result is a flow meter which can be used when conventional power supplies are not available and also a flow meter which is intrinsically safe and can thus be used in hazardous areas without the need for an explosion proof enclosure since all the electrical and electronic components of the flow meter meet the requirements of typical specifications for hazardous areas.

Load 50 represents the processor 52 which calculates the flow rate as discussed above (among other functions), ultrasonic transducer power circuit 54 which energizes transducers 56, ultrasonic transducer receiving circuit 58 which receives the signals detected by transducers 56, a display module 60, signal processing circuitry 62, and other circuitry and modules (not shown) but understood by those skilled in the art to be associated with the controlling electronics of an ultrasonic flow meter. Unique to one embodiment of the subject invention is power management subsystem 64 discussed below.

4–20 mA power supply 42 operates in connection with load 50 as follows. When initially configured, a draw of 4 mA from power supply 42 is set to some low level flow rate, for example 0 gpm and a draw of 20 mA is set to a different higher value, e.g., 400 gpm. These particular values will depend upon the specific implementation of flow meter 40. Controller 44 then determines the actual flow rate in a conduit based on the amount of current drawn from power supply 42 (e.g., a draw of 12 mA may represent a flow of 200 gpm). Those skilled in the art will understand the controller 44, load 50, and power regulating circuit 70 may be housed within the same physical electronic flow meter unit 40 or may be separate.

Power regulating circuit 70 of the subject invention is connected between power supply 42 and load 50. In the preferred embodiment, power regulating circuit 70, FIG. 4 includes power converter 80 responsive to power supply voltage $V_{ps}$ output by loop power supply 42 to vary the load voltage $V_L$ supplied to load 50 in response to control signal $V_c$. A hazardous area safe storage device such as a capacitor 82 (e.g., 90 μF) between converter 80 and load 50, stores power when not needed by load 50 and delivers power to load 50 when required. Control subsystem 84 provides control signal $V_c$ to converter 80 based on the present setting of loop power supply 42 by load 50. In the preferred embodiment, control subsystem 84 includes control amplifier 86 (for example, Analog Devices, Inc. part No. AD8541) with one input 88 connected to loop power supply 42 and input 90 connected to reference voltage $V_{ref}$. The processor (52, FIG. 3) of load 50 is programmed to output reference voltage $V_{ref}$ to amplifier 86 based on the calculated flow rate to thus generate the appropriate control signal $V_c$ input to converter 80 which in turn adjusts the load voltage $V_L$ in response.

Figure 4:
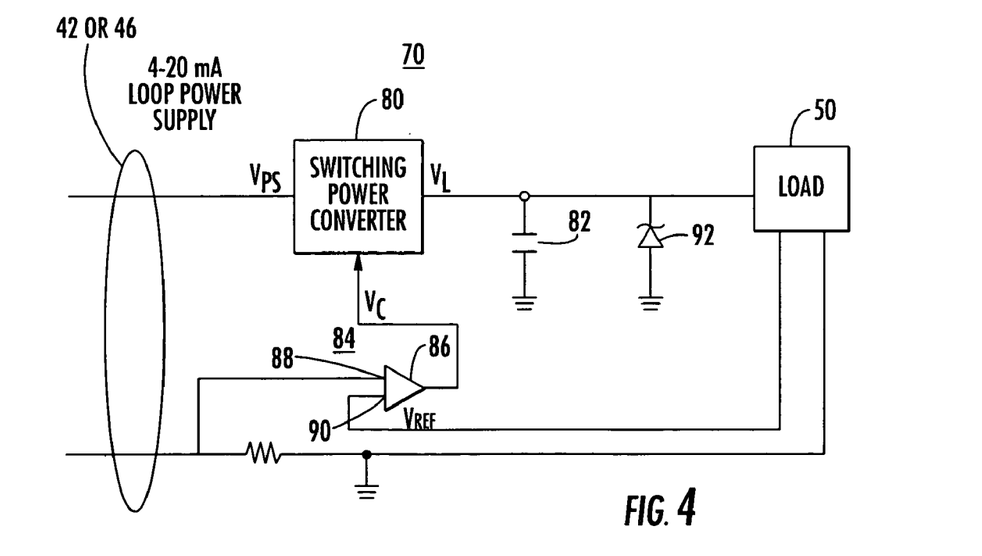
FIG. 4 is a circuit diagram of one embodiment of the power regulating circuit of FIG. 3.

In this way, for example, when the processor determines the flow rate is 400 gpm, 20 mA is then required on loop power supply 42 and $V_{ref}$ is set accordingly. Control amplifier 86, in response to $V_{ref}$, sets $V_c$ to the appropriate value such that converter 80 increases the power applied to capacitor 82 and simultaneously increases the loop current to 20 mA.

When the processor determines that the flow rate is 200 gpm, for example, then 12 mA is required on loop power supply 42 and $V_{ref}$ is set accordingly. Control amplifier 86, in response to $V_{ref}$, sets $V_c$ to the appropriate value such that converter 80 decreases the power delivered to capacitor 82 and simultaneously decreases the loop current to 12 mA.

This novel design for power regulating circuit 70 renders the design intrinsically safe and efficiently provides and regulates the input power which in turn is used to power the instrument electronics of load 50. The circuit automatically stores excess input power in capacitor 82 (power that is available but not utilized by the instrument electronics) and capacitor 82, in conjunction with power regulating circuit 70, provides a reserve for the transient times when the instrument electronics power consumption exceeds the instantaneous input power. Circuit 70 also tightly controls the loop current of power supply 42.

Figure 5:
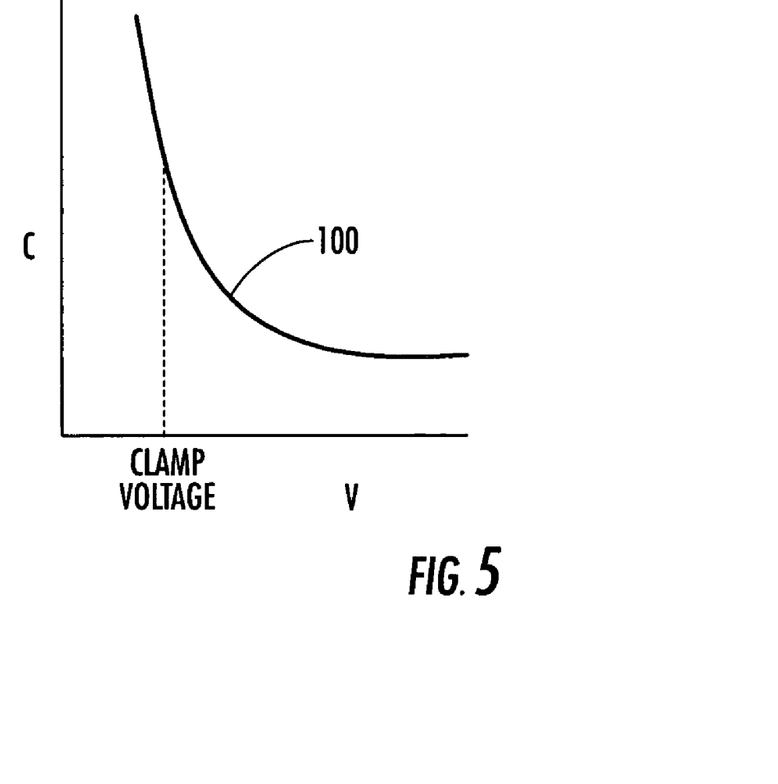
FIG. 5 is a graph showing how the clamping voltage of the Zener diode of the power regulating circuit of FIG. 4 is set in accordance with the subject invention.

Zener diode voltage clamp 92 between converter 80 and load 50 limits the load voltage $V_L$ and maximizes the capacitance value of capacitor 82 by setting a clamp voltage level, FIG. 5, to establish a capacitance value for capacitor 82 that is within the safe limits for hazardous environments (line 100, FIG. 5).

In the preferred embodiment, flow meter 40, FIG. 3 also includes power management subsystem 64 configured to detect the load voltage $V_L$ and to reduce the power consumption of load 50 (e.g., $V_L$) at at least one predetermined set point to ensure that sufficient power is always available to keep the electronic subsystems of the load operational. In one example, the power management subsystem includes both a high level power management section and a low level power management section.

Figure 6:
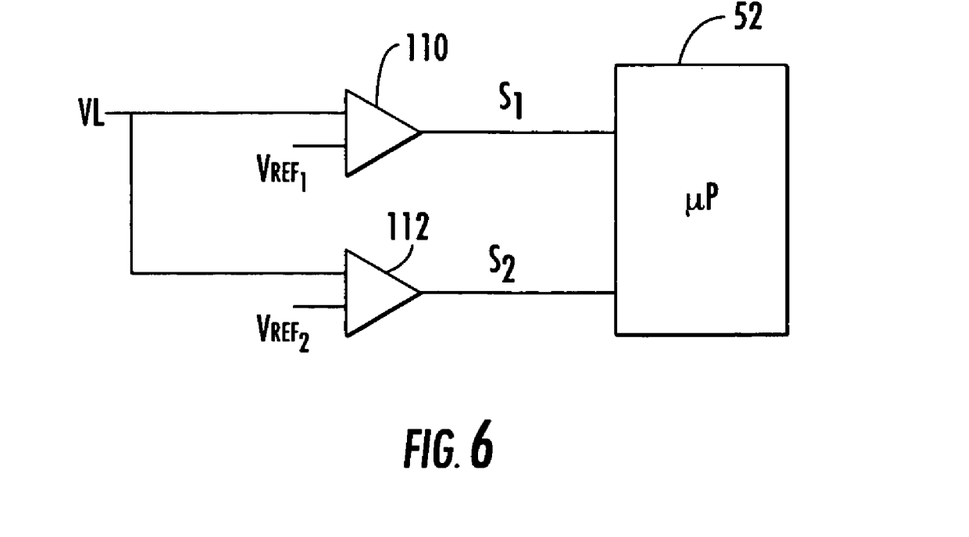
FIG. 6 is a portion of a circuit diagram showing one example of a low level power management subsystem for the flow meter shown in FIG. 3.
Figure 7:
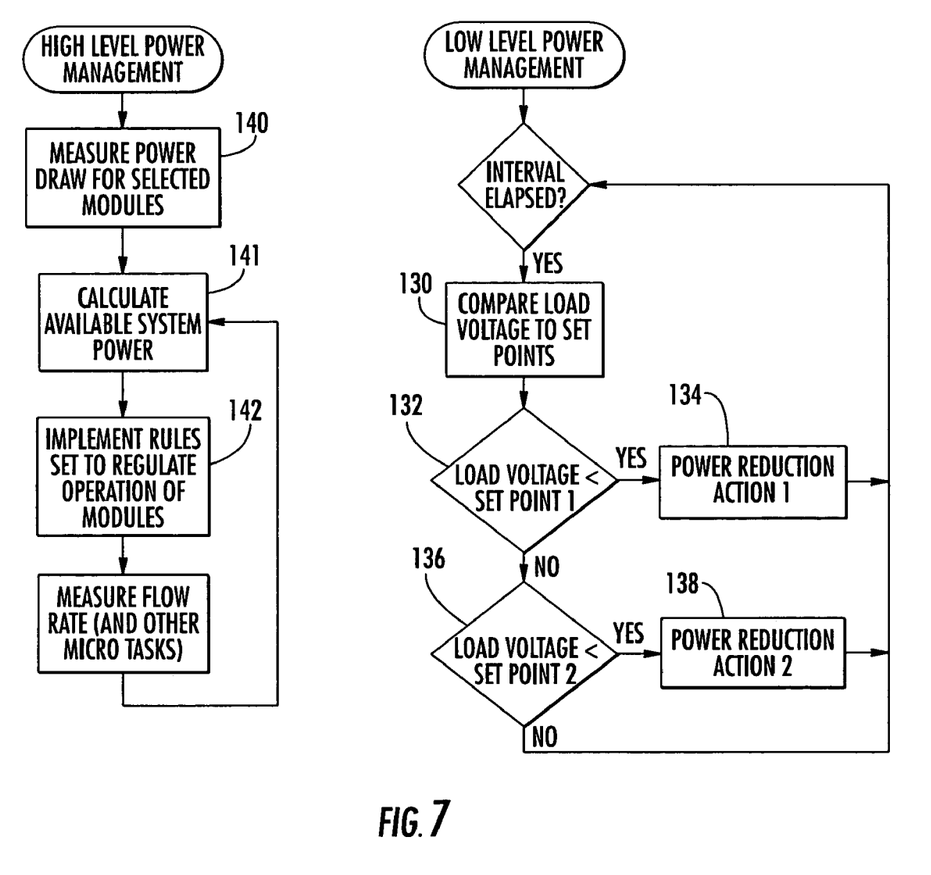
FIG. 7 is a flow chart depicting the primary steps associated with both the high level power management and low level of power management sections of the power management module of FIG. 3.

In the preferred embodiment of the low level power management section, voltage detector 110, FIG. 6 is configured to compare the load voltage $V_L$ with a first set point voltage $V_{ref1}$, steps 130–132, FIG. 7 and to output a first warning signal $S_1$ to processor 52, FIG. 6 when the load voltage $V_L$ is less than the set point voltage reference $V_{ref1}$. Processor 52 is then programmed to initiate a first power reduction instruction set (step 134, FIG. 7) in response to signal $S_1$ to reduce the load power consumption. Voltage detector 112, FIG. 6 is configured to compare the load voltage $V_L$ with a second set point $V_{ref2}$ and to output a second warning signal $S_2$ to processor 52 when the load voltage $V_L$ is less than the second set point voltage $V_{ref2}$, step 136, FIG. 7. Processor 52, FIG. 6 is then programmed to initiate a second power reduction instruction set, step 138, FIG. 7, in response to the second warning signal $S_2$ to further reduce the load power consumption.

In one example, voltage detector 110, FIG. 6 is a MAX6380XR44 and $V_{ref1}$ is 4.4 volts while voltage detector 112 is a MAX6380XR38 and $V_{ref2}$ is 3.8 volts. Thus, when $V_L$ is less than 4.4 volts, processor 52, in response to interrupt signal $S_1$ output by detector 110, may lengthen in the interval between ultrasonic pulses transmitted by transmit circuitry 54, FIG. 3 to save power until $V_L$ once again exceeds 4.4 volts. When $V_L$ is less than 3.4 volts, processor 52, in response to interrupt signal $S_2$ output by detector 112, may shut itself down as well as initiate the action of shutting down other modules of load 50 for a predetermined time to save power and insure no memory data is lost. These power reduction instructions, however, are exemplary only and may vary from flow meter to flow meter and from installation to installation.

The high level power management section of power management subsystem 64, FIG. 3 is typically implemented in code run by processor 52 which is thus configured to measure the power draw of selected modules 54, 58, 60, and 62 (and perhaps others) step 140, FIG. 7 of the load, FIG. 6, to calculate the available system power, step 141, and to implement a rules set, step 142, FIG. 7 to regulate the operation of the various modules based on the power draw. Again, this rules set will vary as between different flow meter modules but the processor continues to calculate the maximum power available at any given time and can take actions such as lengthening or shortening the time interval between successive ultrasonic pulses generated by transmit circuit 54, FIG. 3, shut down or slow down signal processing module 62, or the like in order to conserve power.

Two levels of power management allow the flow meter to operate at a wide range of input power. The high level power management utilizes micro-controller 52, FIG. 3, dynamically measure module power and to dynamically measure input power to "schedule" the various modules run time. Controller 53 dynamically measures the run power for each module, step 140, FIG. 7. Next, the total available power is determined by measuring the input voltage and calculating the loop current, step 141. Based on the difference between the total available power and the total module run power, controller 53 determines the amount of power left over for the micro-controller to run. The micro-controller is then duty cycled based on the remaining power.

The lower level of power management utilizes voltage comparators to "flag" when the load voltage has dropped below certain reference points. These flags are continually monitored on a regular interval. The lower level power management section allows the meter to continually operate under dynamic conditions (i.e. load transients, errors in power calculations and module power measurements) that are not accounted for in the high level power management section.

The first set point, at approximately 4.4 volts causes micro-controller 53 to reduce the load power consumption until the load voltage has exceeded this set point. This set point allows the system to achieve increased response time at lower power without causing the meter to "brown-out". It also allows for margin in the power calculations. The second set point, at approximately 3.8 volts, immediately interrupts the micro-controller which causes data to be stored into persistent memory.

Figure 8:
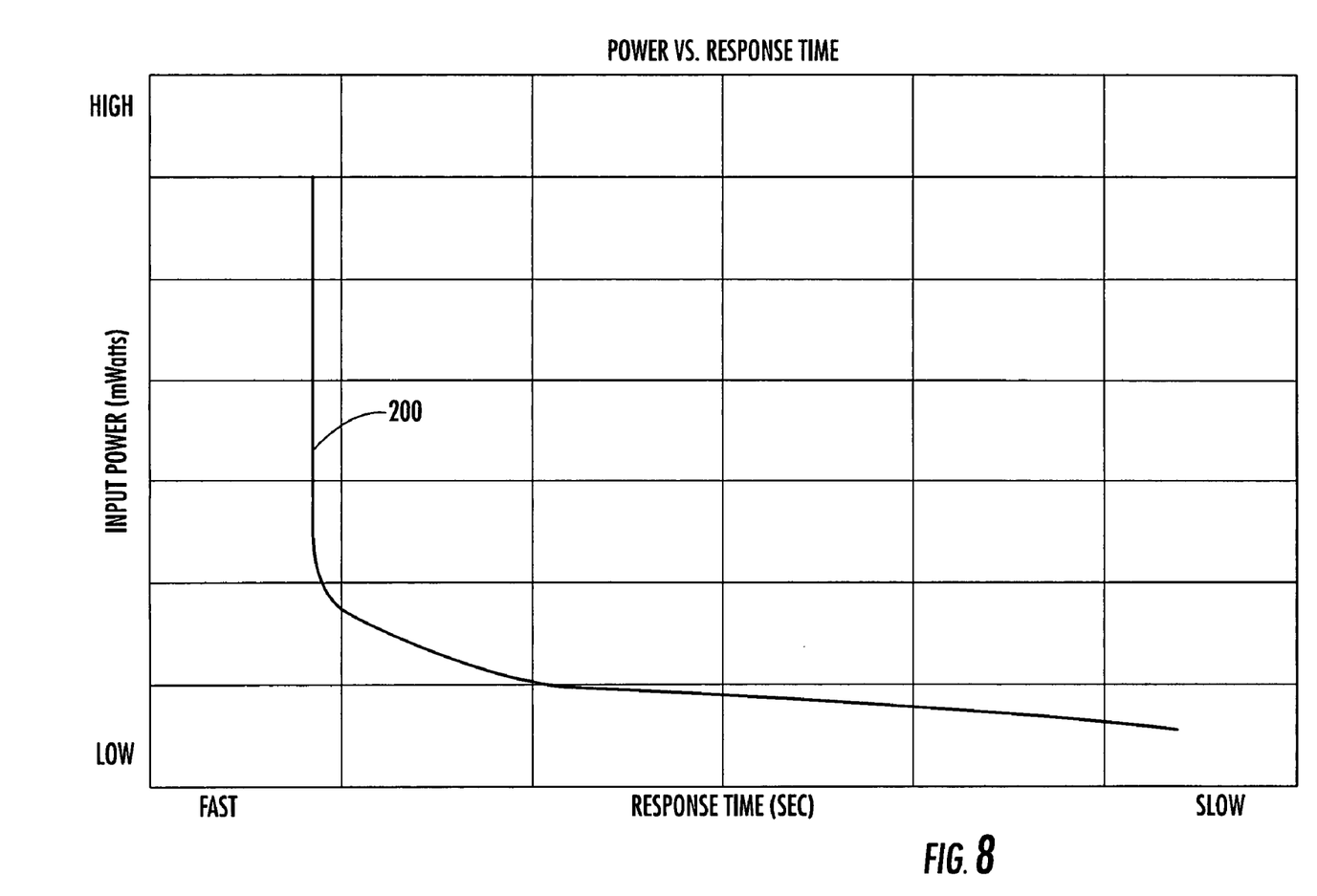
FIG. 8 is a graph showing the variable data update rate based on the power consumption feature for the ultrasonic flow meter of the subject invention.

In FIG. 8, the data update rate is the X-axis and power consumption is the Y-axis. The power management subsystem of the subject invention adjusts the update rate as shown by line 200 based on the power available at any given time whereas prior art flow meters operated at a constant high level update rate because they always were able to draw sufficiently high power.

To further decrease the power required to operate flow meter 40, transducers 56 preferably include highly efficient composite piezoelectric actuators as discussed in U.S. Pat. No. 6,626,049 incorporated herein by this reference. These composite transducers produce a higher signal-to-noise ratio and allow reduced transducer excitation voltages to considerably reduce the amount of power drawn during the operation of ultrasonic flow meter of the subject invention.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A flow meter comprising:
 a loop power supply for supplying a supply voltage;
 a load powered by a load voltage and including at least a processor for calculating a flow rate, an ultrasonic transducer power circuit, and an ultrasonic transducer receiving circuit;
 a power regulating circuit between the loop power supply and the load, the power regulating circuit including:
  a power converter responsive to the supply voltage to vary the load voltage in response to a control signal,
  a safe storage device between the power converter and the load for storing power when not needed by the load and for delivering power to the load when required by the load, and
  a control subsystem for providing the control signal to the converter based on the setting of the loop power supply by the load; and
 a power management subsystem configured to detect the load voltage and to reduce the load power consumption at at least one predetermined set point.

2. The flow meter of claim 1 in which the loop power supply is a 4–20 mA loop power supply.

3. The flow meter of claim 1 in which the power converter is a switching power converter.

4. The flow meter of claim 1 in which the safe storage device is a capacitor.

5. The flow meter of claim 4 in which the capacitor has a value of less than 100 µF.

6. The flow meter of claim 1 in which the control subsystem includes a control amplifier with one input connected to the loop power supply and another input connected to a reference voltage.

7. The flow meter of claim 6 in which the processor is programmed to output the reference voltage to the control amplifier based on the flow rate.

8. The flow meter of claim 1 in which the power regulating circuit further includes a voltage clamp between the converter and the load for limiting the load voltage.

9. The flow meter of claim 8 in which the voltage clamp is a Zener diode.

10. The flow meter of claim 1 in which the power management subsystem includes a low level power management section.

11. The flow meter of claim 10 in which the low level power management section includes at least a first voltage detector configured to compare the load voltage with a first set point voltage and to output a first warning signal to the processor when the load voltage is less than the first set point voltage.

12. The flow meter of claim 11 in which the processor is programmed to initiate a first power reduction instruction set in response to the first warning signal to reduce the load power consumption.

13. The flow meter of claim 12 in which the low level power management section further includes a second voltage detector configured to compare the load voltage with a second set point voltage and to output a second warning signal to the processor when the load voltage is less than the second set point voltage.

14. The flow meter of claim 13 in which the processor is programmed to initiate a second power reduction instruction set in response to the second warning signal to further reduce the load power consumption.

15. The flow meter of claim 10 in which the power management subsystem further includes a high level power management section.

16. The flow meter of claim 15 in which the high level power management section is configured to measure the power draw of selected modules of the load and to implement a rules set to regulate the operation of the modules based on the power draw of each module.

17. The flow meter of claim 1 further including transducers connected to the load.

18. The flow meter of claim 17 in which each transducer includes a composite piezoelectric element.

19. The flow meter of claim 18 in which the composite piezoelectric element includes an array of cells isolated from each other by channels filled with potting material.

20. The flow meter of claim 1 further including one or more batteries for powering the loop power supply.

21. The flow meter of claim 1 further including one or more solar cells for powering the loop power supply.

22. A flow meter comprising:
a loop power supply for supplying a supply voltage;
a load powered by a load voltage and including at least a processor for calculating a flow rate, an ultrasonic transducer power circuit, and an ultrasonic transducer receiving circuit;
a power regulating circuit between the loop power supply and the load; and
a power management subsystem configured to detect the load voltage and to reduce the power consumption at at least one predetermined set point.

23. The flow meter of claim 22 in which the power regulating circuit includes:
a power converter responsive to the supply voltage to vary the load voltage in response to a control signal;
a safe storage device for storing power when not needed by the load and for delivering power to the load when needed by the load; and
a control subsystem for providing the control signal to the converter based on the setting of the loop power supply by the load.

24. The flow meter of claim 22 in which the loop power supply is a 4–20 mA loop power supply.

25. The flow meter of claim 23 in which the power converter is a switching power converter.

26. The flow meter of claim 23 in which the safe storage device is a capacitor.

27. The flow meter of claim 26 in which the capacitor has a value of less than 100 µF.

28. The flow meter of claim 23 in which the control subsystem includes a control amplifier with one input connected to the loop power supply and another input connected to a reference voltage.

29. The flow meter of claim 28 in which the processor is programmed to output the reference voltage to the control amplifier based on the flow rate.

30. The flow meter of claim 23 in which the power regulating circuit further includes a voltage clamp between the regulator and the load for limiting the load voltage.

31. The flow meter of claim 30 in which the voltage clamp is a Zener diode.

32. The flow meter of claim 22 in which the power management subsystem includes a low level power management section.

33. The flow meter of claim 32 in which the low level power management section includes at least a first voltage detector configured to compare the load voltage with a first set point voltage and to output a first warning signal to the processor when the load voltage is less than the first set point voltage.

34. The flow meter of claim 33 in which the processor is programmed to initiate a first power reduction instruction set in response to the first warning signal to reduce the load voltage.

35. The flow meter of claim 34 in which the low level power management section further includes a second voltage detector configured to compare the load voltage with a second set point voltage and to output a second warning signal to the processor when the load voltage is less than the second set point voltage.

36. The flow meter of claim 35 in which the processor is programmed to initiate a second power reduction instruction set in response to the second warning signal to further reduce the load voltage.

37. The flow meter of claim 32 in which the power management subsystem further includes a high level power management section.

38. The flow meter of claim 37 in which the high level power management section is configured to measure the power draw of selected modules of the load and to implement a rules set to regulate the operation of the modules based on the power draw of each module.

39. The flow meter of claim 22 further including transducers connected to the load.

40. The flow meter of claim 39 in which each transducer includes a composite piezoelectric element.

41. The flow meter of claim 40 in which the composite piezoelectric element includes an array of cells isolated from each other by channels filled with potting material.

42. The flow meter of claim 22 further including one or more batteries for powering the loop power supply.

43. The flow meter of claim 22 further including one or more solar cells for powering the loop power supply.

44. A flow meter comprising:
a loop power supply for supplying a supply voltage;
a load powered by a load voltage and including at least a processor for calculating a flow rate, an ultrasonic transducer power circuit, and an ultrasonic transducer receiving circuit; and
a power regulating circuit between the loop power supply and the load, the power regulating circuit including:
a power converter responsive to the supply voltage to vary the load voltage in response to a control signal,
a safe storage device for storing power when not needed by the load and for delivering power to the load when required by the load, and
a control subsystem for providing the control signal to the converter based on the setting of the loop power supply by the load.

45. The flow meter of claim 44 in which the loop power supply is a 4–20 mA loop power supply.

46. The flow meter of claim 44 in which the power converter is a switching voltage regulator.

47. The flow meter of claim 44 in which the safe storage device is a capacitor.

48. The flow meter of claim 47 in which the capacitor has a value of less than 100 µF.

49. The flow meter of claim 44 in which the control subsystem includes a control amplifier with one input connected to the loop power supply and another input connected to a reference voltage.

50. The flow meter of claim 49 in which the processor is programmed to output the reference voltage to the control amplifier based on the flow rate.

51. The flow meter of claim 44 in which the power regulating circuit further includes a voltage clamp between the converter and the load for limiting the load voltage.

52. The flow meter of claim 51 in which the voltage clamp is a Zener diode.

53. The flow meter of claim 44 further including a power management subsystem configured to detect the load voltage and to reduce the load voltage in response to at least one predetermined set point.

54. The flow meter of claim 52 in which the power management subsystem includes a low level power management section.

55. The flow meter of claim 54 in which the low level power management section includes at least a first voltage detector configured to compare the load voltage with a first set point voltage and to output a first warning signal to the processor when the load voltage is less than the first set point voltage.

56. The flow meter of claim 55 in which the processor is programmed to initiate a first power reduction instruction set in response to the first warning signal to reduce the load voltage.

57. The flow meter of claim 56 in which the low level power management section further includes a second voltage detector configured to compare the load voltage with a second set point voltage and to output a second warning signal to the processor when the load voltage is less than the second set point voltage.

58. The flow meter of claim 57 in which the processor is programmed to initiate a second power reduction instruction set in response to the second warning signal to further reduce the load voltage.

59. The flow meter of claim 53 in which the power management subsystem includes a high level power management section.

60. The flow meter of claim 59 in which the high level power management section is configured to measure the power draw of selected modules of the load and to implement a rules set to regulate the operation of the modules based on the power draw of each module.

61. The flow meter of claim 44 further including transducers connected to the load.

62. The flow meter of claim 61 in which each transducer includes a composite piezoelectric element.

63. The flow meter of claim 62 in which the composite piezoelectric element includes an array of cells isolated from each other by channels filled with potting material.

64. The flow meter of claim 44 further including one or more batteries for powering the loop power supply.

65. The flow meter of claim 44 further including one or more solar cells for powering the loop power supply.

66. A method of regulating power between a loop power supply and a load powered by a load voltage, the method comprising:
varying the load voltage in response to a control signal;
storing power when not needed for the load;
delivering stored power to the load when required to power the load;
adjusting the control signal based on the setting of the loop power supply;
detecting the load voltage; and
reducing the load voltage at a predetermined set point.

67. The method of claim 66 in which the loop power supply is a 4–20 mA loop power supply.

68. The method of claim 66 in which adjusting the control signal includes comparing the loop power supply to a reference voltage.

69. The method of claim 68 in which the reference voltage level is based on a flow rate.

70. The method of claim 66 further including clamping the load voltage at a predetermined limit.

71. The method of claim 66 in which reducing the load voltage includes comparing the load voltage with a first set point voltage and outputting a first warning signal when the load voltage is less than the first set point voltage.

72. The method of claim 71 including initiating a first power reduction instruction set in response to the first warning signal to reduce the load voltage.

73. The method of claim 71 in which reducing the load voltage further includes comparing the load voltage with a second set point voltage and outputting a second warning signal when the load voltage is less than the second set point voltage.

74. The method of claim 73 including initiating a second power reduction instruction set in response to the second warning signal to further reduce the load voltage.

75. The method of claim 66 in which reducing the load voltage includes measuring the power draw of selected modules of the load and implementing a rules set to regulate the operation of the modules based on the power draw of each module.

* * * * *

UNITED STATES PATENT AND TRADEMARK OFFICE
CERTIFICATE OF CORRECTION

| | | |
|---|---|---|
| PATENT NO. | : 7,058,521 B2 | Page 1 of 1 |
| APPLICATION NO. | : 10/810882 | |
| DATED | : June 6, 2006 | |
| INVENTOR(S) | : Kowal et al. | |

It is certified that error appears in the above-identified patent and that said Letters Patent is hereby corrected as shown below:

On Title Page item 56
 under "U.S. PATENT DOCUMENTS", one additional cited reference should be included before "2003/0139146", namely --2003/0014198 1/2003 Kramer et al.--; and On Title Page item 57
 in the last line of the Abstract: "A power management detects the load voltage and to reduces the power consumption of the load at one or more predetermined set points" should read --A power management subsystem detects the load voltage and reduces the power consumption of the load at one or more predetermined set points--

Signed and Sealed this

Twelfth Day of December, 2006

JON W. DUDAS
*Director of the United States Patent and Trademark Office*